Dec. 9, 1941.  E. J. KOSKI  2,265,487
TURNING TOOL
Filed June 2, 1939   6 Sheets-Sheet 1

INVENTOR.
ELMER J. KOSKI
BY Kwis Hudson & Kent
ATTORNEYS

Dec. 9, 1941.  E. J. KOSKI  2,265,487
TURNING TOOL
Filed June 2, 1939  6 Sheets-Sheet 3

INVENTOR.
ELMER J. KOSKI
BY
Kwis Hudson & Kent
ATTORNEYS

Patented Dec. 9, 1941

2,265,487

UNITED STATES PATENT OFFICE 2,265,487

TURNING TOOL

Elmer J. Koski, Lyndhurst, Ohio, assignor to The Warner & Swasey Company, Cleveland, Ohio, a corporation of Ohio Application June 2, 1939, Serial No. 277,071

23 Claims. (Cl. 82—35)

This invention relates to a turning tool for a machine tool and more particularly to a multiple cutter turning tool.

An object of the invention is to provide an improved and novel turning tool for a machine tool wherein a multiple number of cutters are employed and which turning tool is so designed and constructed that it is capable of use in a variety of ways and therefore may be designated as a universal turning tool.

A further object is to provide a turning tool embodying a multiple number of cutters and which is of improved construction, possessing rigidity, strength and efficiency in operation, while at the same time the parts are readily accessible for adjustment for various diameters and lengths of cuts.

A still further object is to provide a multiple cutter turning tool which is so designed and constructed as to adequately resist the stresses set up therein during a cutting operation and which tool includes effective and ample provision for steadying the work during such cutting operation.

A still further object is to provide a multiple cutter turning tool which, as stated above, is susceptible of universal use and wherein various arrangements of the supports for the cutting tools can be provided, together with provision for reversing or changing such supports to provide different arrangements or for changing or varying the spacing between the cutting edges of the different cutting tools and the relationship to such tools of the means for steadying the work piece.

Another object is to provide a multiple cutter turning tool so constructed that accuracy or close tolerance in the work piece can be maintained under heavy cuts at high speeds.

Another object is to provide a multiple cutter turning tool wherein the various cutters are independent of each other and can be adjusted or added without disturbing cutting diameters already set.

A still further object is to provide a multiple cutter turning tool capable of accurately cutting a plurality of different diameters of varying lengths at the same time.

A still further object is to provide a multiple cutter turning tool that can be easily and quickly set up and which is more efficient and economical in use, in that it enables the production time of the various work pieces to be materially reduced.

Another object is to provide in a multiple cutter turning tool a multiple number of steady rests for the work piece whereby the work piece can be steadied during the cutting operations and at such points throughout the length of the work piece where it is most desirable or necessary to do so to prevent deflection of the work piece under the cutting thrusts.

Further and additional objects and advantages not hereinbefore specified will become apparent hereinafter during the detailed description which is to follow an embodiment of the invention.

Referring to the accompanying drawings illustrating the embodiment of the invention.

Fig. 4 is a side elevational view of the turning tool shown in Figs. 1 and 3.

The multiple cutter turning tool embodying the invention may be used on various machine tools, but by way of example it will be described herein as mounted on a face of the turret of a turret lathe, a portion of said turret being indicated at 20 in Fig. 3, but the remainder of the turret lathe not being illustrated as it is well known in the art.

The multiple cutter turning tool comprises, in the present instance, a body or base in the form of a casting and which is substantially L-shaped and has a vertical portion 21 and a horizontal portion 22. The vertical portion 21 of the body is provided with a countersunk opening in which is fitted a pilot ring 23 for centering the body with respect to the opening in the turret face and to the axis of the work spindle. It will be understood that various pilot rings may be used to fit different sized openings in the turret face and that the work piece can extend through said rings and turret opening. The body is secured to the turret face by suitable screws or bolts such as the screws 24, as will be well understood in the art.

Figure 2:
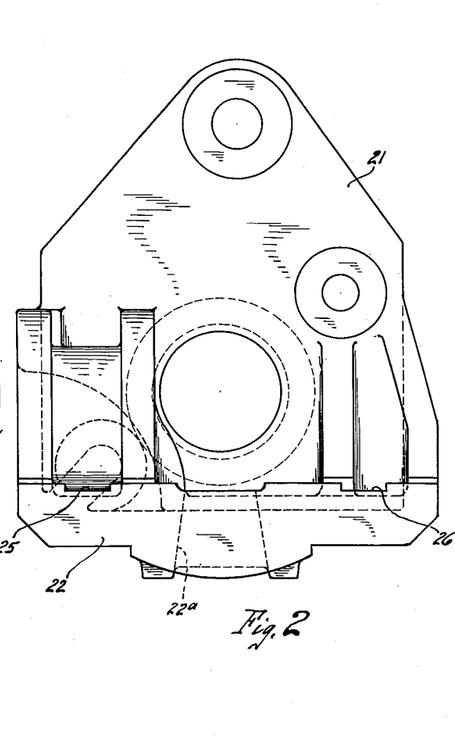
Fig. 2 is a similar view but simply shows the supporting body or base of the turning tool, the cutters and thrust resisting members, together with their supports being omitted.

The portion 21 of the body has an upward extension, as shown in Figs. 2 and 4, for a purpose later to be made clear. It will be noted that the body at the junction of the portions 21 and 22 and adjacent the left-hand side of the body, as viewed in Fig. 2, is cored to provide a recess in which is located the head of the lower bolt 24, as viewed in Fig. 4, a slot in the body enabling the same to be positioned upon said bolt, as clearly shown in Fig. 2.

The horizontal portion 22 of the body is provided with parallel longitudinally extending guide grooves 25 and 26 located adjacent the side edges of the portion 22 and these grooves are to adjustably receive supports for the thrust resisting members and tool blocks, respectively, as will later be explained. The grooves 25 and 26 are provided with elongated cored openings 27 through which extend clamping bolts, later to be referred to, (see Fig. 3). The portion 22 of the body intermediate the grooves 25 and 26 and substantially centrally of the body is provided with cored openings 22a, as clearly indicated in Figs. 3 and 4, to allow chips to fall therethrough during the cutting operation.

The support 28 for the thrust resisting members is provided with a tongue 29 which fits the groove 25 and acts to position and locate the support on the horizontal portion 22 of the body, so that the support can be adjusted on the body in a direction parallel to the axis of the work and for the purpose of resisting radial thrust during cutting operations. The lower end of the support 28 is machined and bears upon the machined upper side of the portion 22 of the body on opposite sides of the groove 25.

Figure 5:
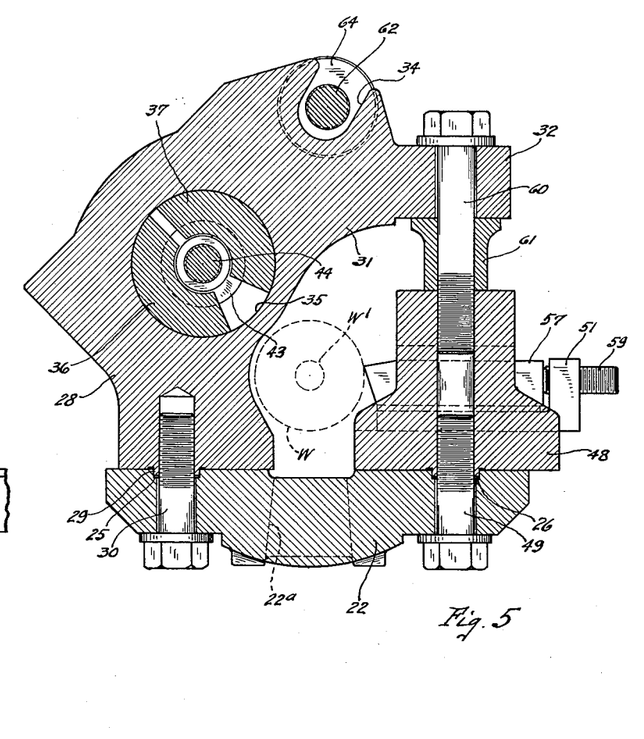
Fig. 5 is a vertical sectional view taken substantially on line 5—5 of Fig. 4 looking in the direction of the arrows.
Figure 6:
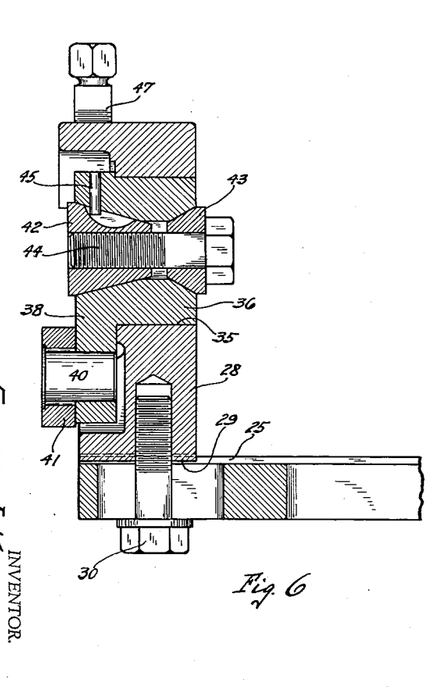
Fig. 6 is a sectional view taken on irregular line 6—6 of Fig. 1 looking in the direction of the arrows.

The support is clamped in adjusted position on the portion 22 of the body by means of a clamping bolt 30 that extends through the cored opening 27 in the groove 25 and screws into a threaded recess formed in the support as clearly shown in Figs. 5 and 6.

The support 28 is provided with a laterally extending portion 31 at the upper end of which is an ear 32 provided with an elongated slot 33 for a purpose later to be explained, see Figs. 3 and 11. The laterally extending portion 31 of the support is provided with a diagonally and downwardly extending slot 34 through which extends a tie rod later to be referred to.

Figure 1:
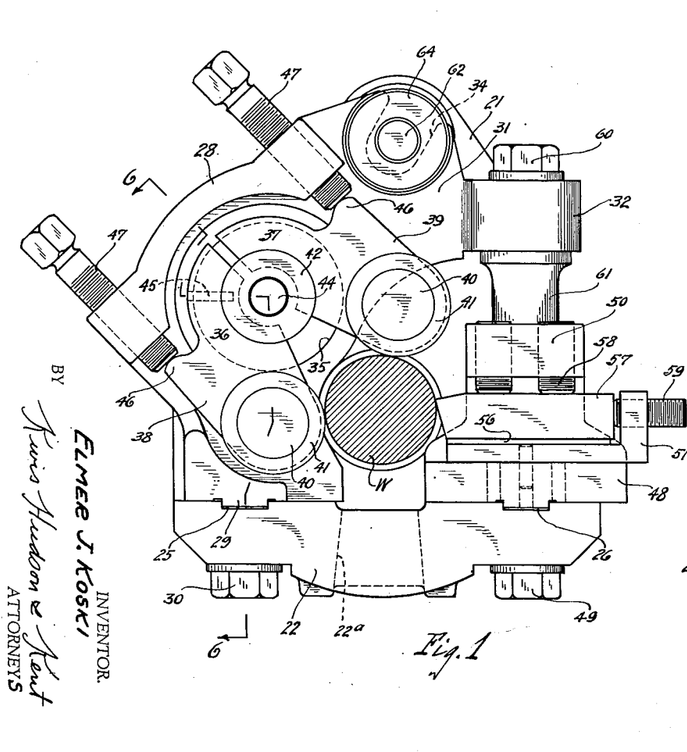
Fig. 1 is an end elevational view of the multiple cutter turning tool.
Figure 7:
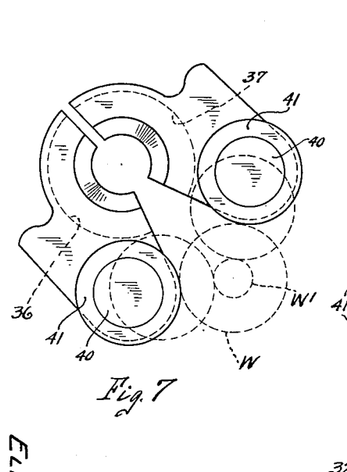
Fig. 7 is a detached elevational view of the thrust resisting members shown in Fig. 1, the positions of the thrust resisting rollers for minimum and maximum diameters of work pieces being indicated.

The support for the thrust resisting members is provided with a central opening 35 in which are mounted complementary segmental sleeve-like portions 36 and 37 that are provided with integral arms 38 and 39, respectively, carrying at their lower ends pins 40, upon which are rotatably mounted thrust resisting rollers 41, a suitable anti-friction bearing such as a needle bearing, being interposed between the pins 40 and the rollers 41, (see Figs. 1, 6 and 7).

The complementary segmental sleeve-like portions 36 and 37 when mounted in assembled relationship in the opening 35 in the support form a centrally disposed bore having adjacent its ends conical portions which are connected by a cylindrical portion intermediate its ends, as clearly seen in Fig. 6. The conical portion at the left-hand end of the bore through the complementary segmental sleeve-like portions 36 and 37 is longer than the conical portion at the right hand end thereof and said segmental sleeve-like portions are wedged radially outwardly to clamping position in the opening 35 by means of a conical nut 42 and a conical washer 43, drawn toward each other by a bolt 44. The conical nut 42 is held against turning movement by means of a pin 45 carried by the sleeve-like portion 36 and extending into a recess formed in the nut, as clearly shown in Figs. 1 and 6.

The segmental sleeve-like portions can be adjusted endwise in the opening 35 in a direction parallel to the axis of the work and they can be angularly moved with respect to each other to shift the relative position of the arms 38 and 39 together with the relative position of the rollers 40 carried thereby, and when these adjustments have been made, can be secured or clamped in adjusted position by means of the conical nut 42, washer 43 and bolt 44. The rollers 41 indicated in full lines in Fig. 7 are in engagement with a work piece W of maximum diameter while the rollers indicated by dash lines are in engagement with a work piece W' of minimum diameter.

The segmental sleeve-like portions 36 and 37 are each provided with lateral extensions having an abutting heel 46 adapted to be engaged by the ends of abutting screws 47 mounted in threaded openings formed in an overhanging portion of the support 28. It will be understood that the purpose of providing the abutment heels 46 and abutment screws 47 is to prevent accidental movement of the thrust resisting rollers 40 when heavy cuts are being taken by the cutting tools.

Figure 11:
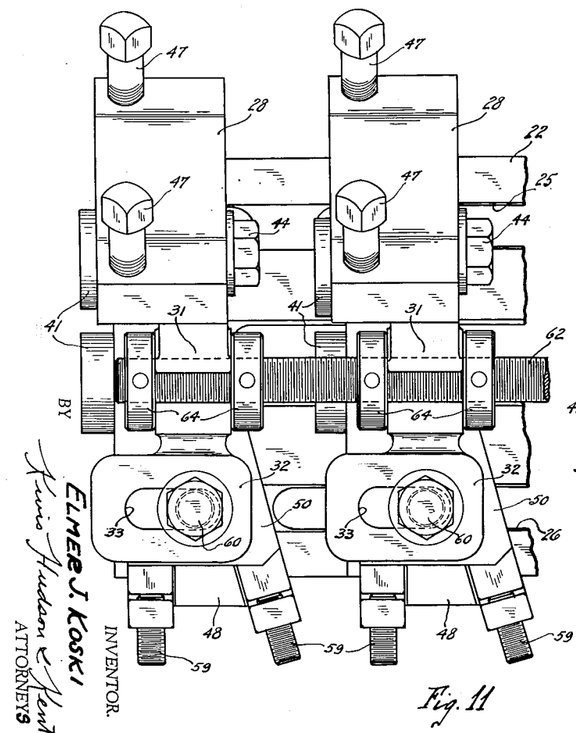
Figs. 11 and 12 are fragmentary views similar to Figs. 3 and 4, but illustrate the multiple cutter turning tool when employing a multiple number of supports for thrust resisting members.
Figure 12:
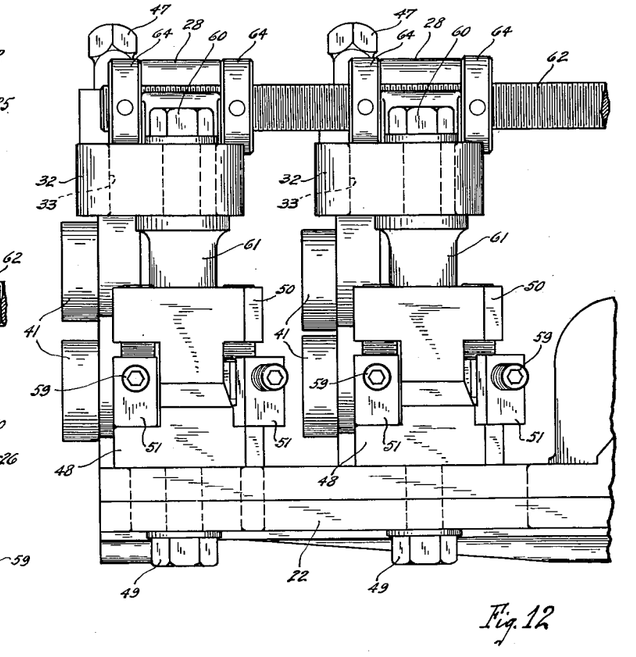

In Figs. 1 to 7 inclusive only one support 28 for one pair of thrust resisting members is shown mounted on the body of the multiple cutter turning tool, while in Figs. 11 and 12 a plurality of such supports are shown mounted on the body. The manner and instances in which a single support for one pair of thrust resisting members or a plurality of supports for a plurality of pairs of such members will be employed will be discussed later herein in greater detail.

One or more tool supports 48 can be mounted on the horizontal portion 22 of the base by means of a tongue or tongues on the underside of the support or supports fitting the groove 26, and such support or supports are clamped in position by means of screws 49 passing through the elongated cored openings 27 in the base or body and screwed into threaded openings formed in the support or supports.

Each tool support has an upwardly extending T-shaped portion 50. One side of the T-shaped portion 50 of each tool support is at right angles to the tongue on the bottom of the support, while the other side of the T-shaped portion 50 is disposed at an angle to the tongue other than a right angle, that is to say, one side of the T- shaped portion will be at a right angle to the axis of the work piece and the other side will be disposed at an acute or obtuse angle thereto, as clearly shown in Figs. 3 and 13 to 16 inclusive.

Figures 7, 8, 9, 10:
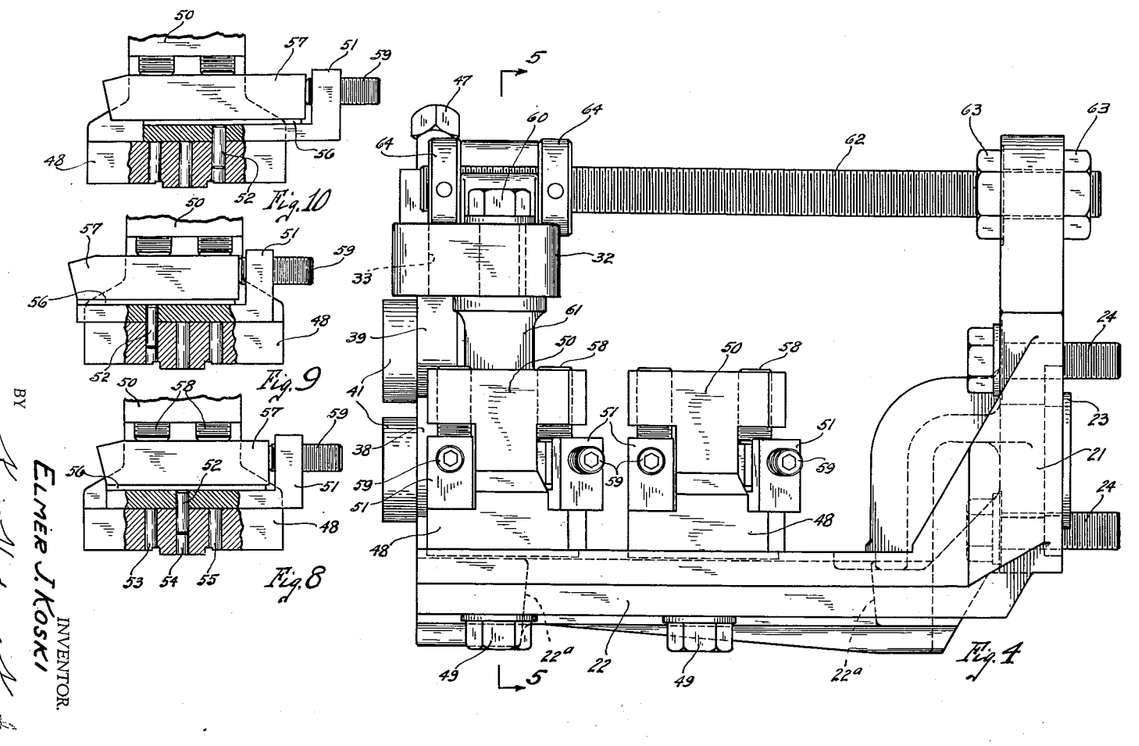
Fig. 8 is a detail view of the tool block partly in elevation and partly in section and shows the means for locating the tool on the block in various operating positions.
Figs. 9 and 10 are views similar to Fig. 8 but show the cutting tool located in different positions on the block.

Adjustable L-shaped tool rests 51 are mounted on the tool supports 48 on each side of the leg of the T-shaped portion 50 and these rests are provided with an opening to receive one end of a pin 52, the other end of which will extend into any one of three openings formed in the support 48, namely, openings 53, 54 and 55, depending upon the position of the tool rest 51 on the tool support to accommodate tools of different lengths and in order to position the tools for different diameters of work (see Fig. 8).

Each tool rest carries a spacer plate 56 on which is positioned a tool 57. The tool 57 on the spacer plate 56 is clamped in position in the tool rest 51 by means of clamping screws 58 of the socket-head type extending through the crosshead of the T-shaped portion 50 of the tool support and engaging the upper surface of the cutting tool. It will be understood that in positioning the tool so the cutting edge thereof will be at the required height, spacer plates 56 of different thicknesses can be interposed between the underside of the tool and the upper side of the tool rest. The rear end of the tool 57 is engaged by an adjusting screw 59 also of the socket-head type which is screwed through a threaded opening in the vertical arm of the L-shaped tool rest 51 and the adjustment of the screw 59 serves to bring the tool into a proper cutting position.

The threaded opening in the tool support 48 that receives the screw 49 extends vertically through the support and receives the lower end of a screw 60 that passes through the elongated opening 33 in the ear 32 of the support 28 for the thrust resisting members, it being noted that a spacer bushing 61 is interposed between the underside of the ear 32 and the upper side of the T-shaped portion 50 of the tool support. The spacer bushing 61 is for the purpose of enabling a rigid connection to be made between the support 28 and the tool support 48 and also has the further purpose that when it is desired to remove the tool support 48 from its position on the base to reverse the tool support or for any other purpose the bushing 61 can be removed from the screw 60 and thus ample space is provided in which to manipulate the tool support 48 and raise its tongue out of the groove 26.

It will be explained hereinafter with particular reference to Figs. 13 to 16, the manner in which the tool supports can have their positions upon the base reversed so as to position the tools mounted thereon in different relative relationships, but since the tongues on the underside of the tool blocks 48 are arranged symmetrically, said tongues will always be in the grooves 25 when the supports are positioned and thus serve to prevent turning movement of the support on the base and resist the radial thrust during cutting operations.

Figure 3:
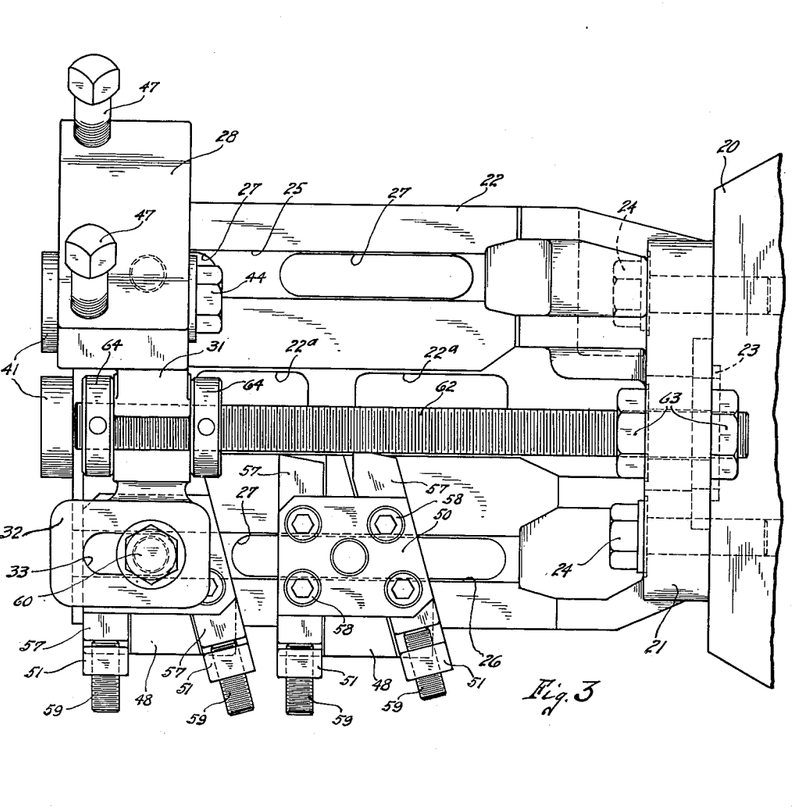
Fig. 3 is a top plan view of the turning tool shown in Fig. 1 and employing only a single support for the thrust resisting members.

The elongated cored openings 27 in the grooves 25 and 26 and the elongated slot 33 in the ear 32 of the support 28 enable the support 28 for the thrust resisting members and the tool supports to be adjusted and clamped in various relative positions on the base, thus giving the turning tool a universality of adjustment as well as enabling a single or a multiple number of supports for the thrust resisting members to be used along with a multiple number of tool supports, as clearly indicated in Figs. 3, 11 and 12 and which will later be referred to in somewhat greater detail.

During cutting operations stresses are set up both longitudinally of the work piece and radially thereof, and it is proposed to employ means for effectively resisting these stresses. The present embodiment contemplates as a practical way of resisting the longitudinal stresses the use of a tie rod 62 that has one of its ends clamped in an opening in the vertical portion 21 of the base by means of clamping nuts 63, while outwardly of such end said tie rod extends through the slot 34 in the portion 31 of the support 28, as clearly shown in Figs. 1, 3 and 5. It will be understood that other means for resisting the longitudinal stresses might be employed with equal advantages.

It will be understood that the tie rod 62 extends through the slot 34 in each support 28 where a multiple number of such supports are employed (see Figs. 11 and 12) and that said rod which is threaded throughout its length is clamped in position on the supports 28 by means of lock nuts 64 screwed on the rod and engaging the opposite sides of the portions 31 of the supports 28.

It will thus be seen that the supports for the thrust resisting members, the tool supports and the base are all throughly tied together both in a direction longitudinally of the turning tool as well as in a direction transversely thereof, it being recalled that the support 28 is firmly united with the tool support by means of the bolt 60 extending through the ear 32 of the support 28 and through the bushing 61 and into the opening in the tool support.

It will be appreciated that during a cutting operation the thrust resisting members and the cutting tool or tools and the supports for said members and tool or tools are subject to thrust in a direction axially of the work piece. However, since these elements of the turning tool are all tied in or integrated in a direction longitudinally of the turning tool there will be no displacement of the thrust resisting members or the cutting tool or tools due to this axial thrust and the stresses set up in the turning tool will be adequately resisted. Likewise, it will be appreciated that during a cutting operation the thrust resisting members and the cutting tool or tools together with their supports are subject to radial thrust and to the strains and stresses resulting therefrom, but since the support or supports for the thrust resisting members and the support or supports for the cutting tools are interconnected and form in effect with the base a rigid ring around the work piece, the thrust resisting members and the cutting tools are not displaced in the slightest degree from their correct relative positions and such radial thrust and the stresses and strains occasioned thereby in the turning tool are adequately taken care of.

The longitudinal and transverse rigidity in the turning tool, as just referred to, enables the cutting of work pieces within extremely close tolerances and allows for accurate machining to specified diameters and lengths of cuts or distances between shoulders formed by different diameters of cuts.

Another inherent advantage obtained from the turning tool having this rigidity of construction is that extremely heavy cuts can be taken by the tools without deflection of any parts of the turning tool and, in addition, a further advantage exists in that a multiplicity of cutting tools can be used to simultaneously take a plurality of heavy cuts upon the work piece.

Reference to Figs. 3 and 4 and to Figs. 11 and 12 will show that the turning tool embodying the present invention is so constructed that either a single support for thrust resisting members can be mounted therein or a multiplicity of supports can be mounted therein. In taking heavy cuts in the work piece, and particularly where a plurality of heavy cuts are taken simultaneously, there is a tendency to deflect the axis of the work piece. This tendency, however, is adequately taken care of in the turning tool of the present invention by utilizing a plurality of thrust resisting supports so that the thrust resisting members carried thereby will engage the work piece at properly spaced points to prevent such deflection under the thrust of the cutting tool or tools.

As shown in Fig. 3, a multiple number of tool supports carrying cutting tools can be used in the turning tool with a single support for the thrust resisting members. This arrangement might be advantageously employed when the work piece and the diameters to be cut thereon are such that there is very little tendency of the work piece to deflect during the cutting operation. However, when the work piece and the diameters to be cut are such that there is an appreciable tendency of the work piece to deflect during the cutting operation, it would be advantageous to employ a multiplicity of supports for the thrust resisting members, such as shown in Figs. 11 and 12.

It has already been stated that each tool support is reversible and that the tool rest 51 carried by each support can be located in various positions by means of the pin 52 and the openings 53, 54 and 55 so as to position the cutting edge of the tool with relation to the diameters to be cut on the work piece and to accommodate different lengths of tools.

Reference to Figs. 8, 9 and 10 clearly illustrates the manner in which the tool rest 51 can be arranged on the tool support in different locations. In Fig. 8 the tool rest carries a short cutting tool and is arranged on the support for cutting a substantially large diameter. In Fig. 9 the same cutting tool as is shown in Fig. 8 is shown on the tool rest with the rest arranged for cutting a relatively small diameter. In Fig. 10 the tool rest is shown as mounted on the tool support in a position to accommodate a relatively long tool. It will also be noted that the tool itself can be adjusted lengthwise on the tool rest through a relatively large distance to accommodate varying diameters of cuts by means of the adjusting screw 59, and then when the tool is properly positioned it can be clamped by the clamping screws 58.

It has already been stated that each tool support can have its position on the base reversed and this fact enables the cutting tools to be arranged in a variety of different ways to enable different diameters of varying lengths to be cut on the work piece.

In Figs. 13 to 16 inclusive there are shown four different ways in which the cutting tools may be arranged by the different positioning of the tool supports on the base of the turning tool.

Figure 13:
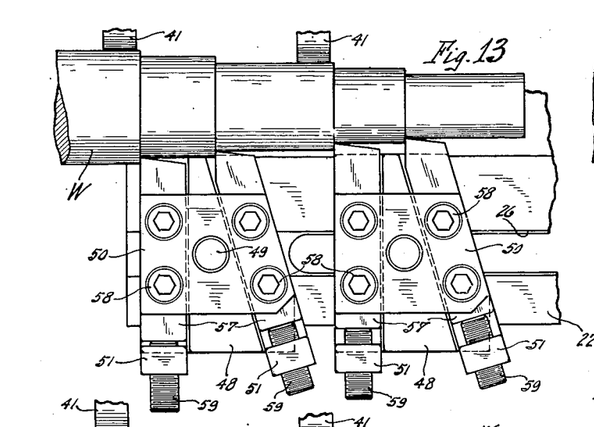
Figs. 13, 14, 15 and 16 are schematic views illustrating some of the different arrangements of cutting tools and thrust resisting members which can be employed in the turning tool embodying the present invention when the standard tool blocks such as shown in the drawings are used.

In Fig. 13 the left-hand tool support is mounted so that the left-hand cutting tool engages the side of the T-portion 50 of the support that is at right angles to the axis of the work piece W, while the right-hand tool support shown in Fig. 13 is similarly positioned upon the base. This arrangement would be used where the lengths of cuts on the work pieces W are relatively short and where the cutting edges of the cutting tools can be located relatively close together.

Figure 14:
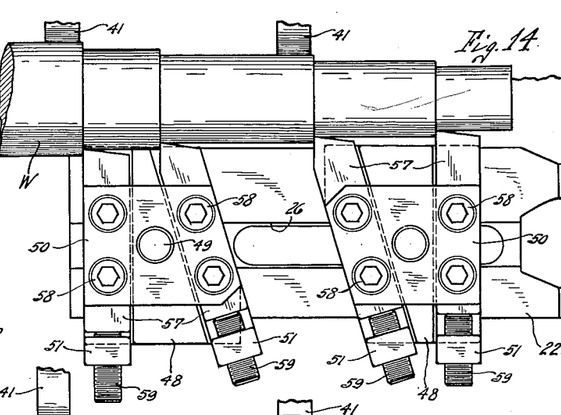

In Fig. 14 the left-hand tool support is mounted on the base in the same manner as are both the tool supports shown in Fig. 13. However, it will be noted that the right-hand tool support shown in Fig. 14 is mounted in the reverse manner, that is, with the side of the T-shaped portion 50 thereof that is at an angle to the axis of the work piece located at the left, while the side thereof that is at right angles to the axis of the work piece is located at the right. This arrangement of the right-hand tool support enables the cutting edges of the tools carried thereby to be located relatively far apart so that they can, therefore cut relatively long distances between the shoulders of the work piece W.

Figure 15:
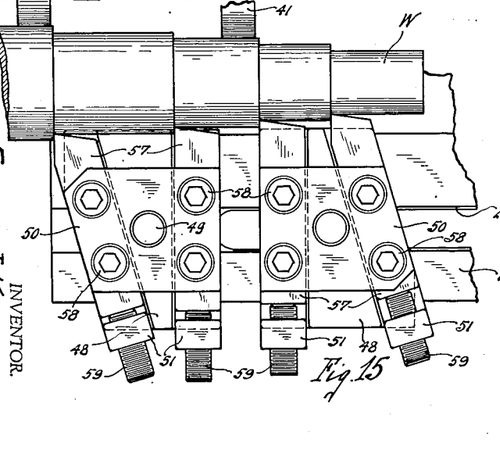

In Fig. 15 the left-hand tool support is reversed to the position of the left-hand tool support shown in Figs. 13 and 14, while the right-hand tool support of Fig. 15 corresponds to the position of the right-hand tool support in Fig. 13. The arrangement of Fig. 15 is such that the cutting edges of the tools carried by the left-hand support are relatively far apart, thus enabling these tools to cut through relatively long distances between shoulders, while the cutting edges of the tools carried by the right-hand support are comparatively close together, since they are to cut distances that are comparatively short.

Figure 16:
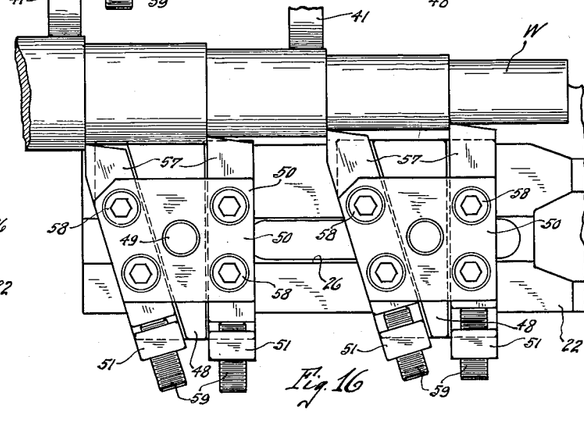

In Fig. 16 the left-hand tool support is arranged in the same manner as the left-hand tool support in Fig. 15, while the right-hand tool support is arranged in the same manner as the right-hand tool support in Fig. 14, the arrangement of Fig. 16 being such that the cutting edges of all the tools are relatively far apart, thus enabling the tools to take relatively long cuts between shoulders.

The examples shown in Figs. 13 to 16 inclusive and described above are merely by way of example, and it will be understood that the tool supports can be arranged in a number of other different ways to provide different arrangements of distances between the cutting edges of the tools carried thereby and this can be accomplished by varying the distance between the tool supports themselves on the base and also by changing the angular position of the individual cutting tools on the tool rests, so long as said tools remain in position to be engaged by the clamping screws 58.

It will be noted in Figs. 13 to 16 inclusive that a multiplicity of thrust resisting members spaced axially of the work piece have been shown, but it will be understood that this arrangement may be varied.

It will be noted that each cutting tool is so mounted in its support that it can be independently and individually adjusted for varying diameters of cuts and for varying heights, as well as for different distances between shoulders of cuts, i. e., by rocking the cutting tool, and this feature is most important as it permits the individual cutting tools to be removed from the turning tool for purposes of sharpening or grinding without disturbing the location and set-up of the other cutting tools carried by the turning tool.

It will also be noted that the thrust resisting members carried by each support 28 can be properly positioned to the correct diameter of work and can be shifted lengthwise to position the thrust resisting rollers in the proper relationship to the cutting edge of the cutting tools and then rigidly clamped in these adjusted positions by means of a single clamping bolt that expands the complementary segmental portions of the thrust resisting members into tight gripping or clamping engagement.

It will also be noted that the screws 47 which engage with the abutting heels 46 adequately provide for the thrust resisting members taking the heavy thrusts occasioned by heavy cuts.

Although a preferred embodiment of the invention has been illustrated and described herein it will be understood that the invention is susceptible of various modifications and adaptations within the scope of the appended claims.

Having thus described my invention I claim:

1. A turning tool of the character described, a body, a support for thrust resisting members adjustably mounted on said body, a tool support adjustably mounted on said body, means separable from said body structurally uniting said supports to resist radial thrusts during cutting operations, and means connected with said supports and said body for resisting thrusts in a direction longitudinally of the body during cutting operations.

2. In a turning tool of the character described, a body, a support for thrust resisting members adjustably mounted on said body, a support for a cutting tool adjustably mounted on said body, and means for structurally interconnecting said supports at a point spaced from said body, said means, said supports and said body thus being integrated structurally in a direction transverse of the turning tool whereby radial thrusts are resisted during cutting operations.

3. In a turning tool of the characetr described, a body, a support for thrust resisting members adjustably mounted on said body, a support for a cutting tool adjustably mounted on said body, one of said supports having a portion extending over the other support, and means connecting said portion of the one support to the other support whereby said supports, said body and said means constitute an integrated structure transversely of the turning tool that resists radial thrusts during cutting operations.

4. In a turning tool of the character described, a body, a support for thrust resisting members adjustably mounted on said body, a support for a cutting tool adjustably mounted on said body, said supports having extended portions arranged in relatively close proximity to each other, and means interconnecting said extended portions to cause said supports, base and said means to form an integrated structure extending transversely of the tool and capable of resisting radial thrust during cutting operations.

5. In a turning tool of the character described, a body, a support for thrust resisting members adjustably mounted on said body, a support for a cutting tool adjustably mounted on said body, said supports having extended portions arranged in relatively close proximity to each other, one of said portions being provided with an elongated slot extending longitudinally of the body, and means extending through said elongated slot and interconnecting said portions to cause said supports, base and said means to form an integrated structure extending transversely of the tool and capable of resisting radial thrust during cutting operations.

6. In a turning tool of the character described, a body, a support for thrust resisting members mounted on said body, a support for a cutting tool mounted on said body, said supports being adjustable longitudinally of said body and relative to each other and having extended portions arranged in relatively close proximity to each other, and means for interconnecting said extended portions of said supports in different positions of relative adjustment therebetween to cause said supports, base and said means to form an integrated structure extending transversely of the tool and capable of resisting radial thrust during cutting operations.

7. In a turning tool of the character described, a body, a support for a cutting tool adjustably mounted on said body, a support for thrust resisting members adjustably mounted on said body and having a laterally projecting portion extending over said first named support and provided with an opening, and a bolt extending through said opening and screwed into said first named support and serving to connect said supports and base to form an integrated structure extending transversely of the tool and capable of resisting radial thrust during cutting operations.

8. In a turning tool of the characted described, a body, a support for a cutting tool adjustably mounted on said body, a support for thrust resisting members adjustably mounted on said body and having a laterally projecting portion extending over said first named support, a spacer interposed between said first named support and said portion, and a bolt extending through said portion and into said first named support and clamping said portion and said support against said spacer and forming a united structure transversely of the turning tool capable of resisting radial thrust during cutting operations.

9. In a turning tool of the character described, a body provided with parallel spaced longitudinally extending guideways, a support for thrust resisting members adjustably mounted on said body and having a portion engaging with one of said guideways, a tool support adjustably mounted on said body and having a portion engaging with the other of said guideways, said supports having extended portions overlapping each other in spaced relation, a spacer arranged between said extended portions, and means interconnecting said extended portions and said spacer whereby when said means is released and said spacer removed said extended portions can be moved relative to each other to permit the withdrawal of the support for the cutting tool or the reversal of its position upon the body.

10. In a turning tool of the character described, a body, a support for thrust resisting members adjustably mounted on said body, a tool support adjustably mounted on said body, means interconnecting said supports outwardly of said body, and means extending longitudinally of said body and operatively associated therewith and connected with one of said supports and resisting thrust in a direction longitudinally of the body during cutting operations.

11. In a turning tool of the character described, a body, a support for thrust resisting members adjustably mounted on said body and having a laterally extending portion, a tool support adjustably mounted on said body, means interconnecting said tool support with said laterally extending portion outwardly of said body, and means operatively associated with said body and said laterally extending portion of said first named support and extending longitudinally of the body for resisting thrust in a longitudinal direction during cutting operations.

12. In a turning tool of the character described, a body, a tool support adjustably mounted on said body, a support for thrust resisting members adjustably mounted on said body and having a laterally extending portion, means interconnecting said portion and said tool support outwardly of said body, and means extending longitudinally of said body and connected therewith and with said laterally extending portion of said second named support against movement relative to said body and said laterally extending portion in a longitudinal direction.

13. In a turning tool of the character described, a body, a tool support adjustably mounted on the body, a support for the thrust resisting members adjustably mounted on the body and having a laterally extending portion spaced from the body and provided with a slot, means interconnecting said portion of said last named support with said tool support, and a bolt rigidly connected to said body and extending longitudinally thereof and passing through said slot in said laterally extending portion of said second named support, and means on said bolt for clamping the same in position in said slot.

14. In a turning tool of the character described, a body, a plurality of tool supports adjustably mounted thereon and spaced longitudinally thereof, a plurality of supports for thrust resisting members adjustably mounted on said body and spaced longitudinally thereof, each of said last named supports being provided with a laterally extending portion spaced from said body, means interconnecting said laterally extending portions with said tool supports, and means operatively associated with said body and said laterally extending portions and extending longitudinally of the body for resisting longitudinal thrust during cutting operations.

15. In a turning tool of the character described, a body having a base portion and a portion extending angularly from said base portion, a support for a cutting tool adjustably mounted on said base portion, a support for thrust resisting members adjustably mounted on said base portion, means interconnecting said supports outwardly of said base portion, and means operatively connected with said angularly disposed portion of said body and the said support for the thrust resisting members and forming with said body and said support an integrated structure in a direction longitudinal of the turning tool.

16. In a turning tool of the character described, a body, a plurality of supports for thrust resisting members adjustably mounted on said body and spaced longitudinally thereof, a plurality of tool supports adjustably mounted on said body and spaced longitudinally thereof, means interconnecting each of said supports for the thrust resisting members with a corresponding tool support, and means operatively connected with said body and passing through each of said supports for the thrust resisting members and connected therewith and acting to resist longitudinal thrust during cutting operations.

17. In a turning tool, a body, a support for a cutting tool, said body and said support having cooperating means locating the support on the body in a predetermined position or in a position reversed thereto, a tool rest mounted on said support, said tool rest and said support being provided with cooperating means locating said rest in a predetermined relative position thereon or in a relative position reversed to said predetermined position, said cooperating means on said tool rest and said tool support enabling the rest to be located in a plurality of different locations in said predetermined position or in said reverse position and which locations extend transversely of said tool support.

18. In a turning tool, a body, a support for cutting tools mounted thereon and having an upstanding portion, one side of which is angularly disposed with respect to the other side thereof, said body and said support having cooperating means for locating the support on the body in a predetermined position or in a position reversed thereto, tool rests mounted on said support on opposite sides of said upstanding portion, said tool rests and said support having cooperating means for positioning the rests in a predetermined position or in a position reversed thereto and for locating said rests in a plurality of different locations on said support in both said predetermined position and said reverse position, and cutting tools clamped on said rests and angularly disposed with respect to each other.

19. In a turning tool, a body, a support for a cutting tool, a tool rest mounted on said support, and cooperating means carried by said support and tool rest and pivotally connecting said rest to said support whereby said rest may be rocked on said support about said pivot to locate the cutting edge of a tool carried thereby in various positions.

20. In a turning tool, a body, a support for thrust resisting members carried by said body, a support for a plurality of cutting tools carried by said body, and means interconnecting said supports with each other and with said body to resist during cutting operations radial and longitudinal thrusts, the thrust resisting members carried by said first named support resisting the thrust of all of the cutting tools carried by said second named support during the cutting operation.

21. In a turning tool of the character described, a substantially L-shaped body provided in one of the arms thereof with parallel spaced longitudinally extending guideways, a support for thrust resisting members mounted on said body and having a portion adjustably engaging with one of said guideways, a tool support mounted on said body and having a portion adjustably engaging with the other of said guideways, and means for clamping said supports in adjusted positions on said body.

22. In a turning tool of the character described, a substantially L-shaped body provided in one of the arms thereof with parallel spaced longitudinally extending guideways, a support for thrust resisting members mounted on said body and having a portion adjustably engaging with one of said guideways, a tool support mounted on said body and having a portion adjustably and reversibly engaging with the other of said guideways, and means for clamping said supports to said body in predetermined adjusted positions.

23. In a turning tool of the character described, a substantially L-shaped body, one arm of which is provided with parallel spaced longitudinally extending guideways and the other arm of which is provided with means for connecting the body to the face of a turret of a machine tool, a support for thrust resisting members mounted on said body and having a portion adjustably engaging with one of said guideways, a tool support mounted on said body and having a portion adjustably engaging with the other of said guideways, means separate from said body interconnecting said supports and forming with said supports and body an integrated structure extending transversely of the tool, and means carried by said other arm of said body and connected with said supports and forming said supports and said body into an integrated structure extending longitudinally of the tool.

ELMER J. KOSKI.